(12) United States Patent
Sekino (10) Patent No.: US 8,494,272 B2
(45) Date of Patent: Jul. 23, 2013

(54) IMAGE PROCESSING DEVICE, IMAGE PROCESSING METHOD, AND COMPUTER READABLE MEDIUM FOR JUDGING IF IMAGES ARE MATCHED

(75) Inventor: Masanori Sekino, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 781 days.

(21) Appl. No.: 12/466,055

(22) Filed: May 14, 2009

(65) Prior Publication Data

US 2010/0158381 A1 Jun. 24, 2010

(30) Foreign Application Priority Data

Dec. 24, 2008 (JP) ................................ 2008-327160

(51) Int. Cl.
*G06K 9/18* (2006.01)
*G06K 9/48* (2006.01)
*G06K 9/62* (2006.01)

(52) U.S. Cl.
USPC ........................... 382/182; 382/200; 382/209

(58) Field of Classification Search
USPC ................................. 382/181, 182, 200, 209
See application file for complete search history.

(56) References Cited

U.S. PATENT DOCUMENTS

| 2002/0009229 A1* | 1/2002 | Fu et al. ........................ 382/199 |
| 2006/0067565 A1* | 3/2006 | Ikeda ........................... 382/124 |
| 2007/0036410 A1* | 2/2007 | Ida et al. ....................... 382/128 |
| 2008/0013836 A1* | 1/2008 | Nakamura et al. ............ 382/209 |
| 2008/0273779 A1* | 11/2008 | Pekar ............................ 382/131 |
| 2009/0123025 A1* | 5/2009 | Deng et al. .................... 382/100 |

FOREIGN PATENT DOCUMENTS

JP A-2007-317033 12/2007

OTHER PUBLICATIONS

Witten et al.; Managing Gigabytes: Compressing and Indexing Documents and Images; 1999; $2^{nd}$ Edition; Morgan Kaufmann Publishers; San Francisco.

* cited by examiner

*Primary Examiner* — Kathleen Y Dulaney (74) *Attorney, Agent, or Firm* — Oliff & Berridge, PLC (57) ABSTRACT

An image processing device including: an image acceptance unit accepting a first image and a second image; a perimeter measurement unit measuring a perimeter of an object image within the first image or an object image within the second image; an area measurement unit measuring an area of the object image within the first image or the object image within the second image; a first reference area generation unit generating a first reference area based on the perimeter and area measured; a datum point extraction unit extracting datum points from the first image and the second image; and a first match judgment unit making the datum points coincide with each other, and judging whether or not the object image within the first image and the object image within the second image are matched, based on densities of the first and second image within the first reference area.

9 Claims, 9 Drawing Sheets

FIG. 11B

IMAGE PROCESSING DEVICE, IMAGE PROCESSING METHOD, AND COMPUTER READABLE MEDIUM FOR JUDGING IF IMAGES ARE MATCHED

CROSS-REFERENCE TO RELATED APPLICATIONS

This application is based on and claims priority under 35 U.S.C. 119 from Japanese Patent Application No. 2008-327160 filed Dec. 24, 2008.

BACKGROUND

1. Technical Field

The present invention relates to an image processing device, an image processing method, and a computer readable medium.

2. Related Art

A technique for matching process involves judging whether or not two images are matched. Two techniques are provided as follows.

(1) Technique for detecting a known pattern from the image. For example, this technique is used for inspection of character or graphic printed on a printed board or the like.

(2) Technique for compressing the document based on the matching process. For example, this technique is performed by extracting the character or graphic element from the image, registering the pattern extracted as a result of the matching process in a dictionary, and encoding the rendering position of image and pattern in the dictionary. A specific example is a process for the text region (Text Region) in the JBIG2 (ITU-T T.88).

In the case of (1), the image size of comparison object is generally fixed.

In the case of (2), the matching process for character and graphic images of any size has to be performed.

And in the case of (2), the matching process for character and graphic images of any size mainly uses a combination of the following two methods.

(2.1) Global Template Matching (Global Template Matching)

The matching process compares the feature amount of the overall image (area, perimeter, center of gravity, moment, number of pores, etc.) between two images. It has the characteristics that because the detailed feature of the image is lost, the matching performance is worse but the computation amount is small.

(2.2) Local Template Matching (Local Template Matching)

The matching process compares the local feature amount (density, pixel distribution, etc.) between two images. It has the characteristics that the matching performance is high but the computation amount is large.

Generally, the global template matching as the screening (coarse sieve) and the local template matching as the minute matching are used jointly.

SUMMARY

According to an aspect of the present invention, there is provided an image processing device including: an image acceptance unit that accepts a first image and a second image; a perimeter measurement unit that measures a perimeter of an object image within the first image or an object image within the second image accepted by the image acceptance unit; an area measurement unit that measures an area of the object image within the first image or the object image within the second image accepted by the image acceptance unit; a first reference area generation unit that generates a first reference area based on the perimeter measured by the perimeter measurement unit and the area measured by the area measurement unit; a datum point extraction unit that extracts datum points from the first image and the second image, respectively; and a first match judgment unit that makes the datum point extracted from the first image and the datum point extracted from the second image coincide with each other, and judges whether or not the object image within the first image and the object image within the second image are matched, based on a density of the first image within the first reference area and a density of the second image within the first reference area.

BRIEF DESCRIPTION OF THE DRAWINGS

Exemplary embodiments of the present invention will be described in detail based on the following figures, wherein.

DETAILED DESCRIPTION

The preferred embodiments of the present invention will be described below with reference to the drawings.

Figure 1:
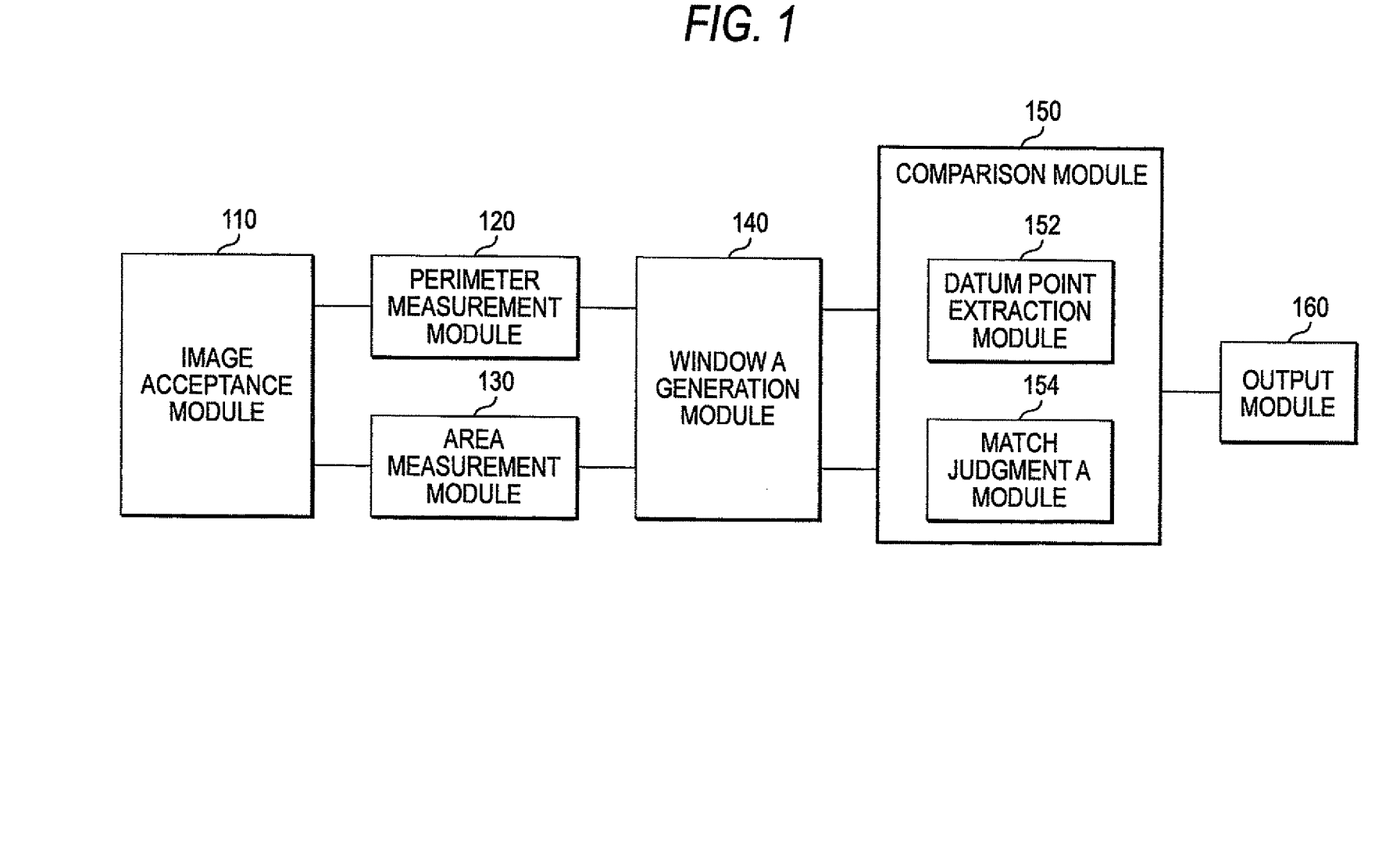
FIG. 1 is a conceptual module block diagram for a configuration example according to the first embodiment.

FIG. 1 is a conceptual module block diagram for a configuration example according to a first embodiment.

A module refers to a component of software (computer program) or hardware that is generally logically separable. Accordingly, the module of this embodiment refers to not only the module in the computer program but also the module in the hardware configuration. Therefore, this embodiment gives the explanation of the computer program, system and method. For purposes of illustration, the "store", "stored", and their equivalent wordings are employed, but these wordings mean to store in the storage device, or controlling to store in the storage device in the embodiment of the computer program. Also, though the modules corresponds substantially one-to-one to the functions, in implementation, one module may be composed of one program, a plurality of modules may be composed of one program, or conversely one module may be composed of a plurality of programs. Also, the plurality of modules may be executed by one computer, or one module may be executed by a plurality of computers in the distributed or parallel environments. One module may include another module. In the following, the term "connection" is used in the physical connection, and the logical connection (exchange of data, instruction, reference relation between data, etc.).

Also, the system or apparatus includes a configuration in which a plurality of computers, hardware and equipment are connected via communication means such as a network (including a one-to-one communication), or a configuration realized by one computer, hardware or equipment. The "apparatus" and "system" are used as synonymous words. The term "predetermined" means being determined before the process of interest, namely, determined before start of the process according to this embodiment, or even after start of the process according to this embodiment, depending on the situation or state at that time, or the previous situation or state.

An image processing device of this embodiment performs a matching process for judging whether or not the object images within two images are matched, and has an image acceptance module 110, a perimeter measurement module 120, an area measurement module 130, a window A generation module 140, a comparison module 150, and an output module 160, as shown in FIG. 1. Preferably, it is employed as the local template matching. Herein, the match includes being exactly coincident, or roughly coincident in the range fulfilling the purpose of the matching process.

The image acceptance module 110 is connected to the perimeter measurement module 120 and the area measurement module 130. The two images (image i and image j) are accepted, and passed to the perimeter measurement module 120 and the area measurement module 130. Accepting the images includes receiving the image after processing by the global template matching, reading the image by a scanner, receiving the image by fax, and reading the image from the image database. The accepted images include the image subjected to the matching process. The image passed to the perimeter measurement module 120 and the area measurement module 130 is a binary image, but the accepted image may be a multi-valued image (including a color image). In the multi-valued image, a binarization process is performed. Also, as the preprocessing, a process such as noise removal, inclination correction or normalization may be performed. The object images include a character image and a graphic image. In the explanation of the embodiment, the object image is composed of the black pixel.

The perimeter measurement module 120 is connected to the image acceptance module 110 and the window A generation module 140. The perimeter of the object image within the image i or image j accepted by the image acceptance module 110 is measured. For example, the distance is measured by tracking the perimeter (boundary between the white pixel and the black pixel) Also, the perimeter of the object image within any one of the images i and j may be measured, or the perimeters of both the object images may be measured. Particularly, for the image after processing by the global template matching, the perimeter of the object image within one image may be measured, because the images are similar as a whole. Also, in the case where the perimeters of the object images within both the images are measured, the average value may be obtained. And the measured perimeter (one or two perimeters) is passed to the window A generation module 140.

The area measurement module 130 is connected to the image acceptance module 110 and the window A generation module 140. The area of the object image within the image i or image j accepted by the image acceptance module 110 is measured. For example, the black pixels of the object image are counted. Also, the area of the object image within any one of the images i and j may be measured, or the areas of both the object images may be measured. Particularly, for the image after processing by the global template matching, the area of the object image within one image may be measured, because the images are similar as a whole. Also, in the case where the areas of the object images within both the images are measured, the average value may be obtained. And the measured area (one or two areas) is passed to the window A generation module 140. In the case where the area of the object image within any one of the images i and j is passed, the perimeter measurement module 120 is followed.

The window A generation module 140 is connected to the perimeter measurement module 120, the area measurement module 130 and the comparison module 150. A window of reference area is generated based on the perimeter measured by the perimeter measurement module 120 and the area measured by the area measurement module 130. And the generated window is passed to the comparison module 150. The window is rectangular, and square in the explanation of this embodiment.

As a specific example, not to depend on the resolution or size of the image, the size of the window is decided as follows.

It is assumed that the area of the object image is A, the perimeter of the object image is L, and the size of the window (length of one side of the window) is W.

$W = k \times A/L$ Where $k$ is a proportionality constant.

That is, the window size (W) may be decided in proportion to the area (A) and in inverse proportion to the perimeter (L).

As a more specific example, it is assumed that the area of the object image of the image i is Ai, the area of the object image of the image j is Aj, and their perimeters are Li and Lj.

$W = k \times F(Ai/Li, Aj/Lj)$ Where $k$ is a proportionality constant.

Also, a function F is preferably $F(x,y) = \min(x,y)$. Namely, the window has a smaller size.

Also, k in the above expression is a default value, or may be a value determined by the operation of the operator.

The comparison module 150 is connected to the window A generation module 140 and the output module 160, and has a datum point extraction module 152 and a match judgment A module 154. The comparison module 150 superposes two images to maximize the matches of pixel values between both the images and scans the window generated by the window A generation module 140. The density of pixels of each image contained within the window is compared by a predetermined method to determine the match/non-match at every window position. If the result of match at the scanned window position (the number of matches within the window is greater than or equal to a predetermined threshold value, for example, there is match at every window position) is obtained, it is judged that the object images within the two images are matched. Otherwise, it is judged that the object images within the two images are not matched.

The datum point extraction module 152 extracts the datum point to judge whether or not the object image within the image i and the object image within the image j are matched. Namely, the datum point for match judgment is extracted from each image. Herein, the datum point is the point for alignment to judge whether or the object image within the image i and the object image within the image j are matched. As a specific example, the datum point is the point at which the matches of pixel values between the image i and the image j are maximum. As a more specific example, it is the center of gravity or the center of the image or object image.

Further, this datum point may be quantized in integral number. That is, the datum point may be the corner (or center) point of pixels.

The match judgment A module 154 matches the datum point extracted by the datum point extraction module 152 for the image i and the image j, and judges whether or not the object image within the image i and the object image within the image j are matched, based on the densities within the window generated by the window A generation module 140 for the image i and the image j. For example, the coordinate system is shifted so that the datum points of the images may be matched, and it is judged whether or not the object images are matched by comparing the densities of the images within the window while scanning the window in this state.

The output module 160 is connected to the comparison module 150. The output module receives the judgment result (whether or not the object image within the image i and the object image within the image j are matched) of the comparison module 150 and outputs it to the outside. For example, it is outputted to a compression device for compressing the image using the judgment result or a recognition device for recognizing the image.

Figure 3A:
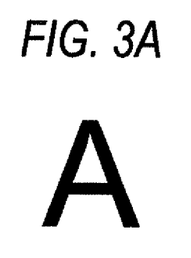
FIGS. 3A to 3D are explanatory views showing a match judgment processing example for the similar graphics.
Figure 3B:
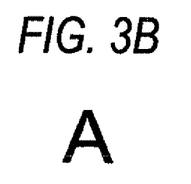
Figure 3C:
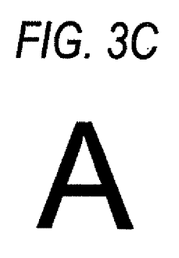
Figure 3D:
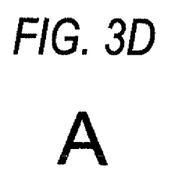

According to the first embodiment, the result of the match judgment is not different for the similar graphics, for example, as shown in FIGS. 3A to 3D. FIGS. 3A to 3D are explanatory views showing a match judgment processing example for the similar graphics. A reduced image of the character image "A" as shown in FIG. 3A is the character image "A" as shown in FIG. 3B, and a reduced image of the character image "A" as shown in FIG. 3C is the character image "A" as shown in FIG. 3D. In the first embodiment, if it is judged that the character image "A" as shown in FIG. 3A and the character image "A" as shown in FIG. 3C are matched, it is judged that the character image "A" as shown in FIG. 3B and the character image "A" as shown in FIG. 3D, which are their reduced images, are matched. Conversely, if it is judged that the character image "A" as shown in FIG. 3A and the character image "A" as shown in FIG. 3C are not matched, it is judged that the character image "A" as shown in FIG. 3B and the character image "A" as shown in FIG. 3D, which are their reduced images, are not matched. For the similar graphics, even if the resolution or size of the image is different, the match judgment is not different.

Figure 4A:
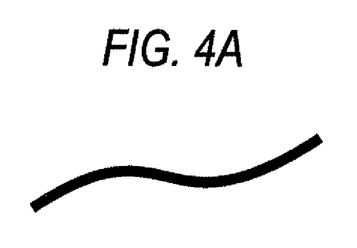
FIGS. 4A and 4B are explanatory views showing a match judgment processing example for the long line segments having different thicknesses.
Figure 4B:
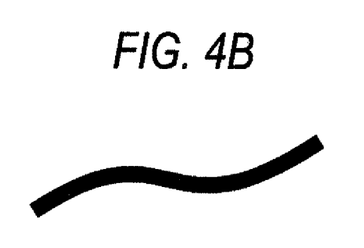

Also, for a long line segment, the easiness of the match changes proportionally to the thickness of the line. FIGS. 4A and 4B are explanatory views showing a match judgment processing example for the long line segments having different thicknesses. A line segment as shown in FIG. 4A and a line segment as shown in FIG. 4B are judged to be matched, because they are matched in the length direction, regardless of the different thicknesses.

Figure 2:
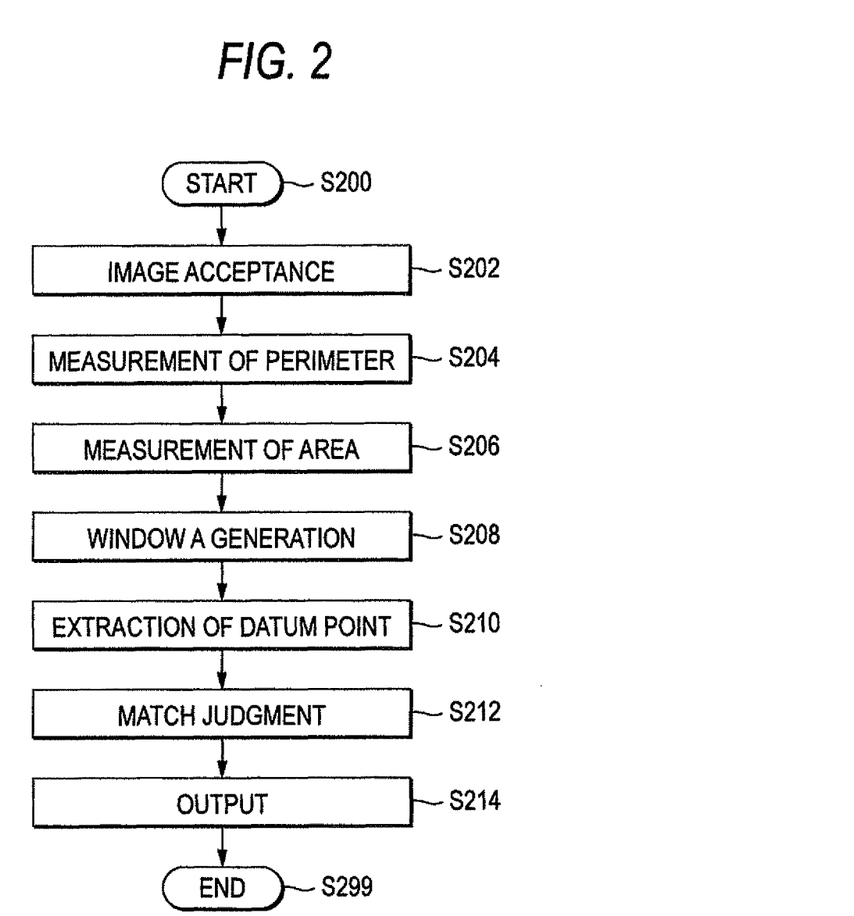
FIG. 2 is a flowchart showing a processing example according to the first embodiment.

FIG. 2 is a flowchart showing a processing example according to the first embodiment.

At step S202, the image acceptance module 110 accepts two images.

At step S204, the perimeter measurement module 120 measures the perimeters of the object images within the two images.

At step S206, the area measurement module 130 measures the areas of the object images within the two images.

The step S202 and step S204 may be performed in reverse order, or in parallel.

At step S208, the window A generation module 140 generates the window, based on the measurement results at step S204 and step S206. For example, the window size W1 is obtained from the areas Ai and Aj and the perimeters Li and Lj of the object images within the two images in accordance with the following expression.

$W1 = k1 \times \min(Ai/Li, Aj/Lj)$ Where $k1$ is a proportionality constant.

Figure 5A:
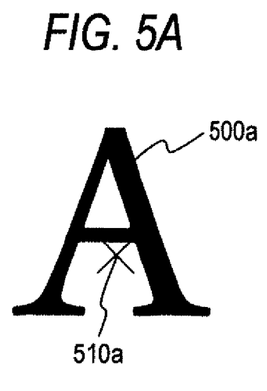
FIGS. 5A and 5B are explanatory views showing an example of datum point.
Figure 5B:
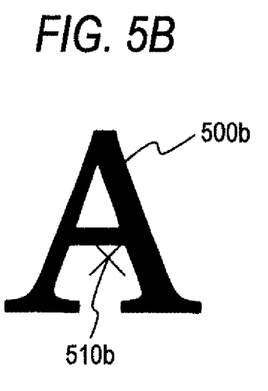

At step S210, the datum point extraction module 152 extracts the point at which the matches of the pixel values between the pixels within the two images are maximum as the datum point. FIGS. 5A and 5B are explanatory views showing an example of the datum point. The datum point extraction module extracts the datum point 510a that is the center of gravity of the object image 500a and the datum point 510b that is the center of gravity of the object image 500b.

Figure 6:
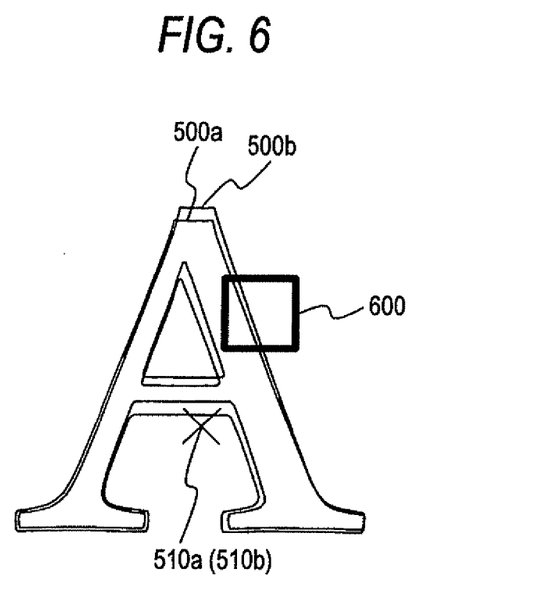
FIG. 6 is an explanatory view showing an example in which the datum points of two images are matched.

At step S212, the match judgment A module 154 superposes the two images at the datum points and scans the window generated at step S208. FIG. 6 is an explanatory view showing an example in which the datum points of the two images are matched. This is a superimposition of one image on another in the example as shown in FIGS. 5A and 5B. That is, the object image 500a and the object image 500b are superposed by matching the datum point 510a and the datum point 510b. And a window 600 is scanned within each image in a state where the datum point 510a and the datum point 510b are matched. The match/non-match for each window is judged depending on the density within the window 600.

At step S214, the output module 160 outputs the judgment result.

A judgment processing example for match/non-match for each window at step S212 will be described below in detail.

If the density D ([0:1]) of each image inside the window being scanned satisfies any of the following conditions 1 or 2, it is judged that the object images within the two images are not matched. Herein, the density D is decided by the number of black pixels among the pixels within the window. For example, the density may be the number of black pixels itself or the (number of black pixels/number of pixels within the window).

$|Di - Dj| \geq T\text{diff}$           1.

$Ci > 0$ and $Cj < 0$, or $Ci < 0$ and $Cj > 0$           2.

Where C is decided in the following way.
C=1 (D>Tblack)
0 (D>Twhite and D<Tblack)
−1 (D<Twhite)

Figure 7:
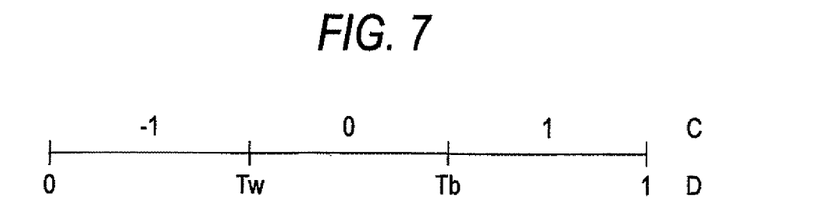
FIG. 7 is an explanatory view showing a threshold value example in the judgment process.

This relationship will be described below, using FIG. 7. FIG. 7 is an explanatory view showing a threshold example in the judgment process. If the density D is larger than Tblack, the value of C is 1. If the density D is larger than or equal to Twhite and smaller than or equal to Tblack, the value of C is 0. If the density D is smaller than Twhite, the value of C is −1.

Under the above conditions, "larger than or equal to" may be "larger than", and "smaller than or equal to" may be "smaller than", or "larger than" may be "larger than or equal to", and "smaller than" may be "smaller than or equal to".

And if the above conditions are not satisfied (the number of times outside the conditions is larger than or equal to a predetermined threshold, for example, the above conditions are not satisfied at every window position) at the scanned window position, it is judged that the object images within the two images are matched.

Tdiff, Tblack and Twhite are the predetermined values. Preferably, Tdiff=0.5, Tblack=pc, and Twhite=1−pc. The pc is a percolation threshold value (pc≈0.5927) in a site process of a two dimensional square lattice.

The percolation threshold value will be described below. The points are rendered randomly on the two dimensional square lattice (this is called the site process of the two dimensional square lattice). In the case of density p>pc, if there is one cluster (group of rendering points adjacent to each other) extending from end to end of the system, the pc at this time is called the percolation threshold value (refer to: D. Stauffer, A. Ahalony, translated by Takashi Odagaki, "Basic Principle of Percolation", Yoshioka Shoten, ISBN4-8427-0298-2)

A second embodiment will be described below.

A module configuration example of the second embodiment is the same as the first embodiment.

In the second embodiment, the datum point extraction module 152 extracts the datum point as the value represented in the integral number. For example, the center of gravity of each image is extracted, and the center of gravity is quantized (in integral number). And the datum point is selected from the points within a predetermined threshold value in a pixel coordinate system from the quantized center of gravity. Preferably, it is selected from the points within ±2 pixels in the horizontal and vertical directions from the quantized center of gravity.

A third embodiment will be described below.

A module configuration example of the third embodiment is the same as the second embodiment.

In the third embodiment, the match judgment A module 154 judges whether or not the image i and the image j are matched in a state where the corner of the window is coincident with the corner of an area including the window generated by the window A generation module 140.

Figure 8A:
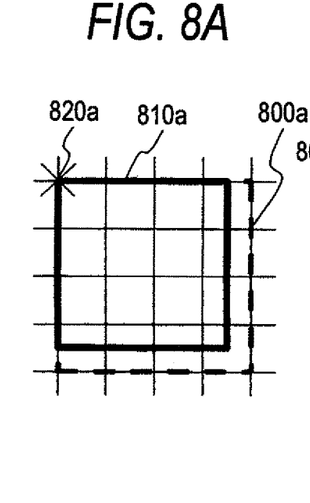
FIGS. 8A to 8D are explanatory views showing a relationship example between the window and the image coordinates.
Figure 8B:
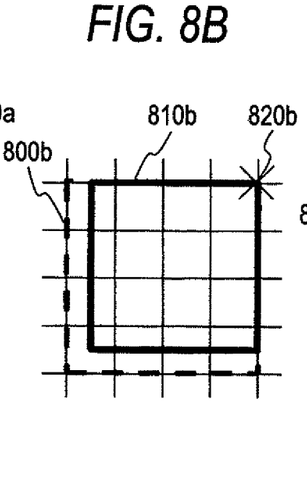
Figure 8C:
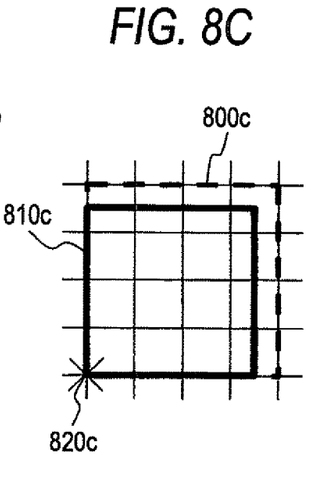
Figure 8D:
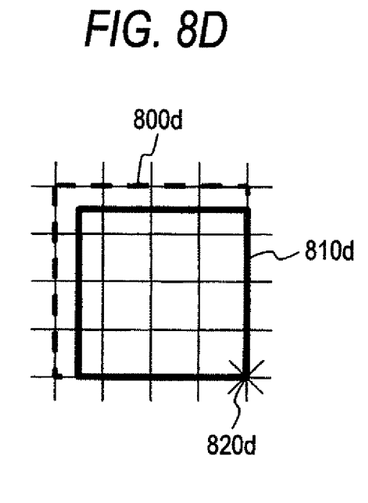

FIGS. 8A to 8D are explanatory views showing a relationship example between the window and the image coordinates. For example, if the window size W is 3.5, only the window of which the corner is any of four points at the upper left, upper right, lower left and lower right may be scanned for each lattice point in the image coordinate system. That is, in an example as shown in FIG. 8A, a correspondence area 800a (rectangle of the dotted line in FIG. 8A, with the size of 4) having the minimum size of integral number including a window 810a (rectangle of the heavy solid line in FIG. 8A is matched with a correspondence point 820a at the upper left of the window 810a. In an example as shown in FIG. 8B, a correspondence area 800b having the minimum size of integral number including a window 810b is matched with a correspondence point 820b at the upper right of the window 810b. In an example as shown in FIG. 8C, a correspondence area 800c having the minimum size of integral number including a window 810c is matched with a correspondence point 820c at the lower left of the window 810c. And in an example as shown in FIG. 8D, a correspondence area 800d having the minimum size of integral number including a window 810d is matched with a correspondence point 820d at the lower right of the window 810d.

Next, a fourth embodiment will be described below.

Figure 11A:
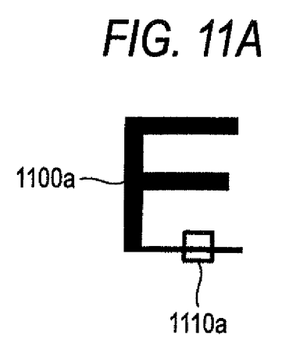
FIGS. 11A and 11B are explanatory views showing an example of the object image with the fine line.
Figure 11B:
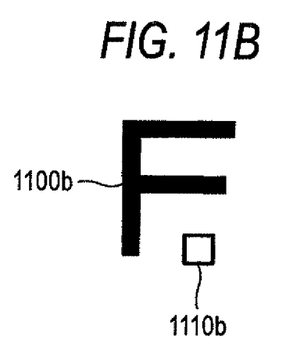

FIGS. 11A and 11B are explanatory views showing an example of the object image with the fine line.

Essentially, it should be judged that the object image 1100a (character image "E") as shown in FIG. 11A and the object image 1100b (character image "F") as shown in FIG. 11B are not matched, but in the previous embodiments, if there is the relatively fine line to the windows (window 1110a, window 1110b), the density of a portion of the fine line is lower, whereby there is the possibility that it is judged that they are matched.

Therefore, in the fourth embodiment, an additional process is provided in which the matching process with the different matching parameter (proportionality constant k and density comparison method) from the window A generation module 140 is added to the process of the previous embodiments, and if the judgment result of match is obtained through both the matching processes, it is generally judged that the two images are matched.

Figure 9:
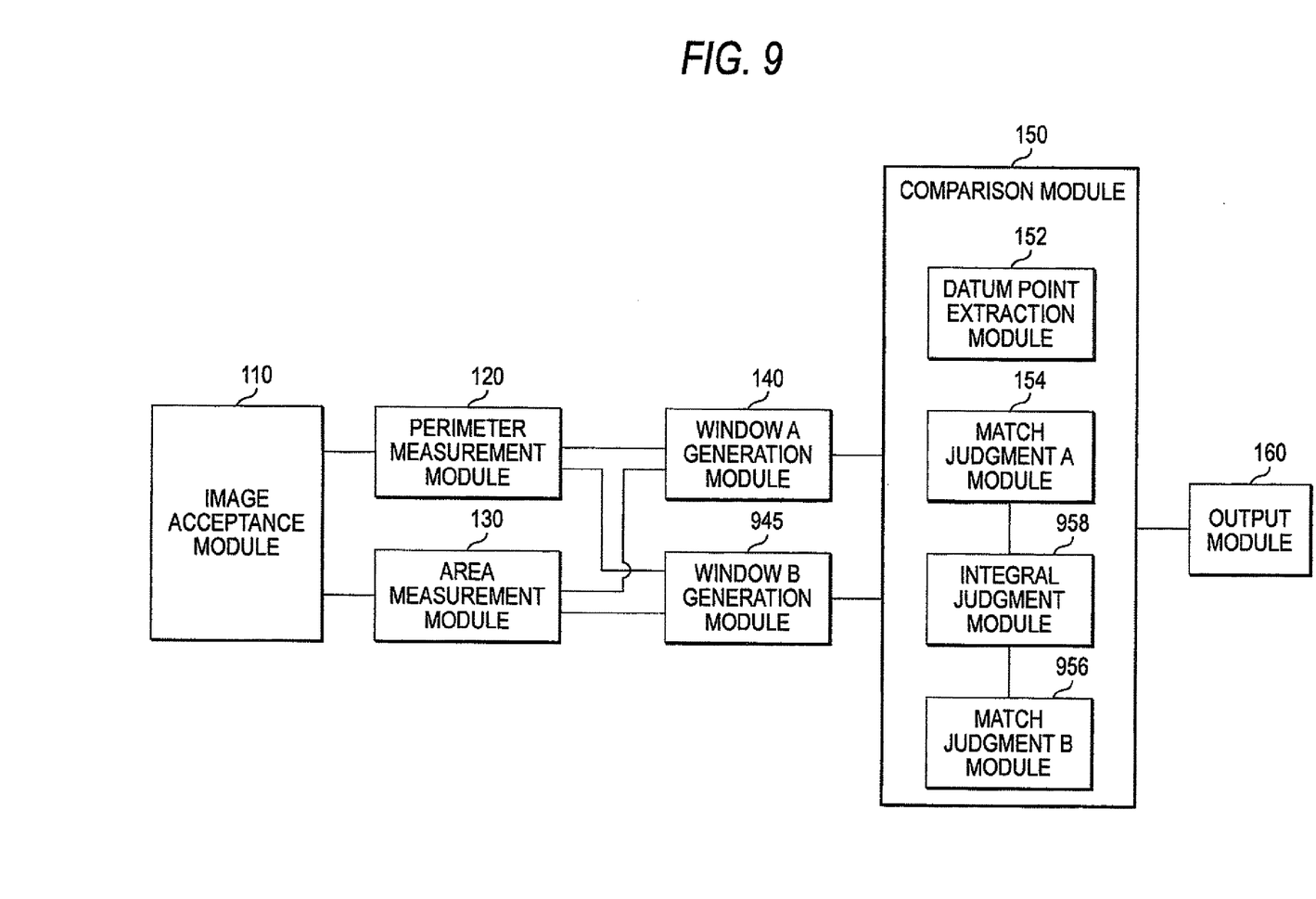
FIG. 9 is a conceptual module block diagram for a configuration example according to the fourth embodiment.

FIG. 9 is a conceptual module block diagram for a configuration example according to the fourth embodiment.

The image processing device comprises the image acceptance module 110, the perimeter measurement module 120, the area measurement module 130, the window A generation module 140, a window B generation module 945, the comparison module 150, and the output module 160. The same or like parts are denoted by the same reference numerals as in the first embodiment (or second or third embodiment), and the repeated explanation is omitted.

The window B generation module 945 is connected to the perimeter measurement module 120, the area measurement module 130 and the comparison module 150, and generates a window B based on the perimeter measured by the perimeter measurement module 120 and the area measured by the area measurement module 130. And the generated window B is passed to the comparison module 150. The window generated by the window A generation module 140 is called the window A.

As a more specific example, it is assumed that the area of the object image of the image i is Ai, the area of the object image of the image j is Aj, and their perimeters are Li and Lj.

$$W2 = k2 \times F(Ai/Li, Aj/Lj)$$ Where k2 is a proportionality constant.

Also, a function F is preferably F(x,y)=min(x,y). Namely, the window has a smaller size.

Also, k2 in the above expression is a default value, or may be a value determined by the operation of the operator. Also, k2 is the different value from the proportionality constant k1 used to generate the window A in the window A generation module 140, and preferably the value smaller than k1 (k2<k1). Accordingly, W2 is a smaller value than the size W1 of the window A in this case.

The comparison module 150 is connected to the window A generation module 140, the window B generation module 945 and the output module 160. The comparison module 150 has the datum point extraction module 152, the match judgment A module 154, a match judgment B module 956, and an integral judgment module 958.

The match judgment A module 154 is connected to the integral judgment module 958, and passes the judgment result to the integral judgment module 958.

The match judgment B module 956, which is connected to the integral judgment module 958, matches the datum points extracted by the datum point extraction module 152 for the image i and the image j, and judges whether or not the object image within the image i and the object image within the image j are matched, based on the densities within the window B generated by the window B generation module 945 for the image i and the image j.

For example, the coordinate system is shifted so that the datum points of the two images may be matched, and it is judged whether or not the object images are matched by comparing the densities of the two images within the window B while scanning the window B in this state.

As a more specific example, if the density Dxor ([0:1]) of the image by taking an exclusive OR (XOR) of the images inside the window being scanned satisfies the following condition, there is no match.

$$Dxor > Txor$$

And if the above condition is not satisfied (the number of times outside the condition is larger than or equal to a predetermined threshold value, for example, the above condition is not satisfied at every window position) at the scanned window position, it is judged that the object images within the two images are matched.

Txor is a predetermined value, and preferably Txor=pc. The pc is the percolation threshold value as previously described.

The integral judgment module 958, which is connected to the match judgment A module 154 and the match judgment B module 956, judges whether or not the object image within the image i and the object image within the image j are matched, based on the judgment result by the match judgment A module 154 and the judgment result by the match judgment B module 956. For example, if it is judged that the object images are not matched by the match judgment A module 154 and the match judgment B module 956, it is judged that there is no match. If it is judged that the object images are matched by one or both of them, it is judged that there is match.

Figure 10:
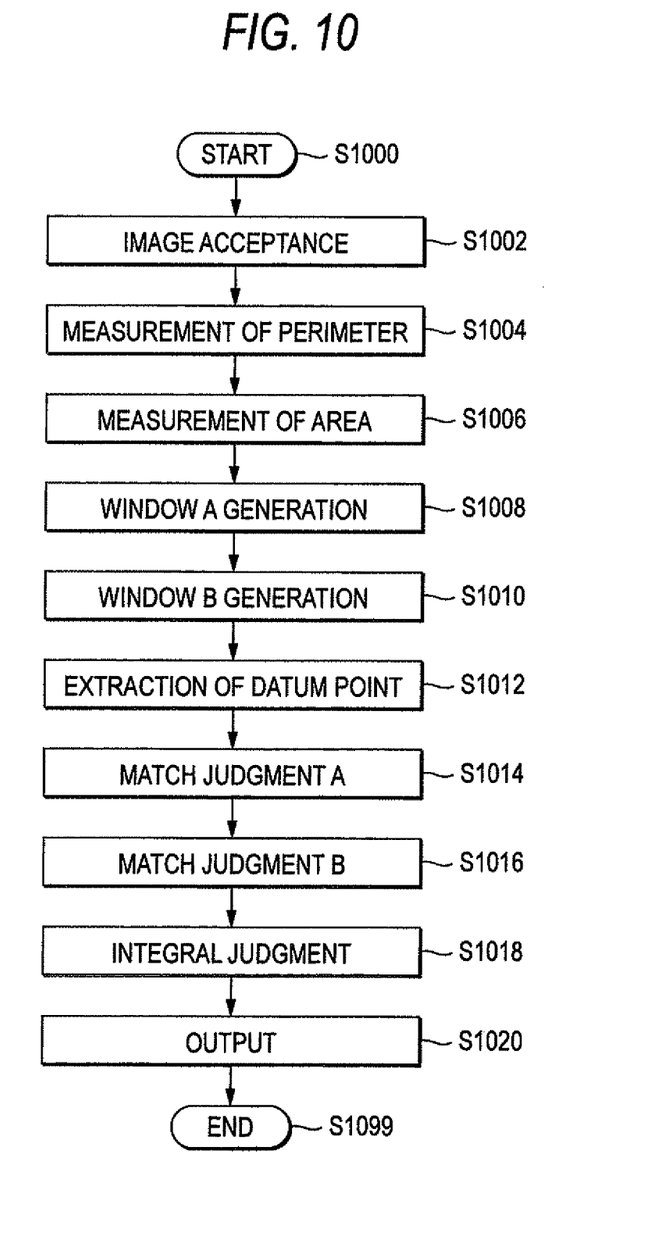
FIG. 10 is a flowchart showing a processing example according to the fourth embodiment.

FIG. 10 is a flowchart showing a processing example according to the fourth embodiment.

The steps of S1002 to S1008 are the same as the steps of S202 to S208 in the flowchart as shown in the example of FIG. 2.

At step S1010, the window B generation module 945 generates the window B.

The steps of S1012 to S1014 are the same as the steps of S210 to S212 in the flowchart as shown in the example of FIG. 2.

At step S1016, the match judgment B module 956 superposes two images at the datum points, and judges whether or not there is match for each window B by scanning the window B generated at step S1010.

At step S1018, the integral judgment module 958 judges whether or not the object images within the two images are matched, based on the judgment results at step S1014 and step S1016.

Step S1020 is the same as step S214 in the flowchart as shown in the example of FIG. 2.

Figure 12:
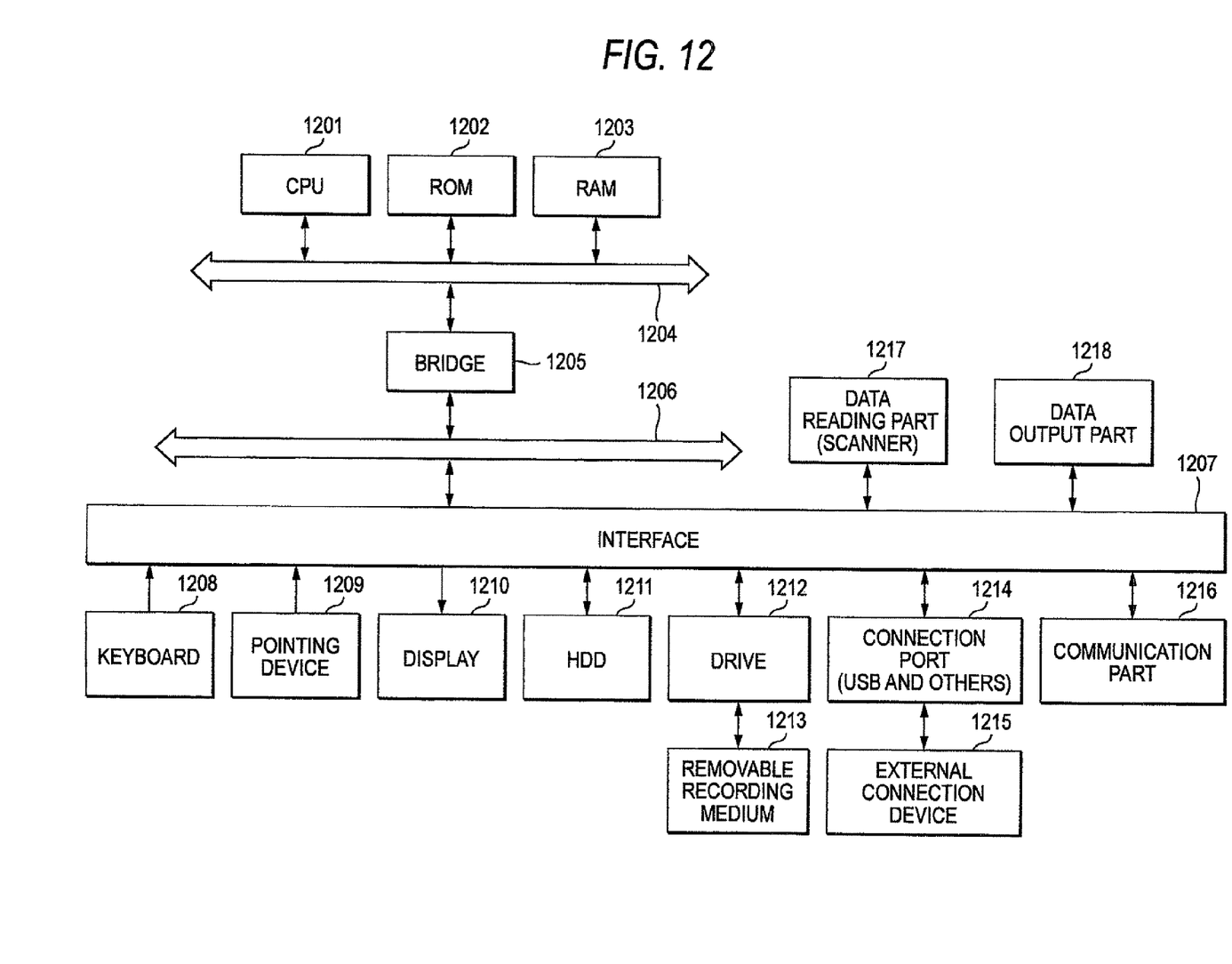
FIG. 12 is a block diagram showing a hardware configuration example of a computer that realizes the first to fourth embodiments.

Referring to FIG. 12, a hardware configuration example of the image processing device according to the previous embodiments will be described below. The hardware configuration example as shown in FIG. 12 has a personal computer (PC), for example, and has a data reading part 1217 such as a scanner and a data output part 1218 such as a printer.

A CPU (Central Processing Unit) 1201 is a control part for performing the process in accordance with a computer program describing an execution sequence of each of various kinds of modules including the perimeter measurement module 120, the area measurement module 130, the window A generation module 140, the window B generation module 945, and the comparison module 150 as described in the previous embodiments.

A ROM (Read Only Memory) 1202 stores a program or an operation parameter used by the CPU 1201. A RAM (Random Access Memory) 1203 stores a program used in the execution of the CPU 1201 and a parameter that appropriately changes in the execution. They are interconnected via a host bus 1204 including a CPU bus.

The host bus 1204 is connected via a bridge 1205 to an external bus 1206 such as a PCI (Peripheral Component Interconnect/Interface) bus.

A keyboard 1208 and a pointing device 1209 such as a mouse are the input devices operated by the operator. A display 1210 is a liquid crystal display unit or CRT (Cathode Ray Tube) that displays various kinds of information as text or image information.

An HDD (Hard Disk Drive) 1211 internally comprises a hard disk, and drives the hard disk to record or regenerate the program or information executed by the CPU 1201. In the hard disk, the image accepted by the image acceptance module 110 and the measurement results of the perimeter measurement module 120 and the area measurement module 130 are stored. Further, the other data processing programs and computer programs are stored.

A drive 1212 reads the data or program recorded in a mounted removable recording medium 1213 such as a magnetic disk, an optical disk, a magneto-optical disk or a semiconductor memory, and supplies the data or program to the RAM 1203 connected via an interface 1207, an external bus 1206, the bridge 1205, and the host bus 1204. The removable recording medium 1213 can be also used as a data recording area, like the hard disk.

A connection port 1214 is a port for connecting an external connection device 1215, and has a connection part such as a USB or IEEE1394. The connection port 1214 is connected to the CPU 1201 through the interface 1207 and via the external bus 1206, the bridge 1205 and the host bus 1204. A communication part 1216 connected to a network performs a data communication process with the outside. A data reading part 1217 is a scanner, for example, to perform a reading process for the document. A data output part 1218 is a printer, for example, to perform an output process for document data.

The hardware configuration of the image processing device as shown in FIG. 12 is only illustrative, and this embodiment is not limited to the configuration as shown in FIG. 12, but may be the other configuration capable of performing the modules as described in the embodiments. For example, part of the modules maybe composed of the dedicated hardware (e.g., Application Specific Integrated Circuit: ASIC), or part of the modules may be placed within the external system and connected via a communication line. Further, a plurality of systems as shown in FIG. 12 may be connected with each other via the communication line to operate in cooperation with each other. Also, the image processing device of the invention may be incorporated into a copy machine, a facsimile apparatus, a scanner, a printer or a multi-function printer (image processing device having two or more functions of the scanner, printer, copy machine and facsimile).

The program as described above may be stored in a recording medium, or distributed via communication tools. In this case, the program as described above may be grasped as the invention of the "computer readable recording medium recording the program", for example.

The "computer readable recording medium recording the program" refers to the recording medium on which the program is recorded that can be read by the computer for use to install, run and circulate the program.

Examples of the recording medium include a digital versatile disk (DVD), such as "DVD-R, DVD-RW or DVD-RAM" in accordance with the standards settled on a plan of DVD forum or "DVD+R or DVD+RW" in accordance with the standards settled on a plan of DVD+RW, a compact disk (CD), such as a read-only memory (CD-ROM), a CD recordable (CD-R) or a CD rewritable (CD-RW), a blue ray disk (Blue-ray Disc (registered trademark)), a magneto-optical disk (MO), a flexible disk (FD), a magnetic tape, a hard disk, a read-only memory (ROM), an electrically erasable and programmable read-only memory (EEPROM), a flash memory, and a random access memory (RAM), for example.

And all or part of the program may be recorded in the recording medium, and stored or distributed. Also, it may be transmitted via communication using a transmission medium such as a wire network or a wireless communication network, or a combination thereof, for use in a local area network (LAN), a metropolitan area network (MAN), a wide area network (WAN), internet, intranet, or extranet, for example, or carried on a carrier wave.

Further, the program may be a part of another program, or recorded in the recording medium together with another program. Also, the program may be divided and recorded in a plurality of recording media. Also, the program may be recorded in any form such as by compression or encryption, as far as it is recoverable.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing device comprising:
   an image acceptance unit that accepts a first image and a second image;
   a perimeter measurement unit that automatically measures a perimeter of an object image within the first image or an object image within the second image accepted by the image acceptance unit;
   an area measurement unit that automatically measures an area of the object image within the first image or the object image within the second image accepted by the image acceptance unit;
   a first reference area generation unit that generates a first reference area based on the perimeter measured by the perimeter measurement unit and the area measured by the area measurement unit;
   a second reference area generation unit that generates a second reference area based on the perimeter measured by the perimeter measurement unit and the area measured by the area measurement unit, the second reference area being different from the first reference area;
   a datum point extraction unit that extracts datum points from the first image and the second image, respectively;
   a first match judgment unit that makes the datum point extracted from the first image and the datum point extracted from the second image coincide with each other so that the first image and the second image are superimposed and so that the first reference area includes portions of the first image and the second image, and judges whether or not the object image within the first image and the object image within the second image are matched, based on a density of the first image within the first reference area and a density of the second image within the first reference area;
   a second match judgment unit that makes the datum point extracted from the first image and the datum point extracted from the second image coincide with each other, and that judges whether or not the object image within the first image and the object image within the second image are matched, based on a density of the first image within the second reference area and a density of the second image within the second reference area; and
   a third match judgment unit that judges whether or not the object image within the first image and the object image within the second image are matched, based on a judgment result obtained by the first match judgment unit and a judgment result obtained by the second match judgment unit.

2. The image processing device as claimed in claim 1, wherein
   the datum point extraction unit extracts each datum point so that coordinate components of each datum point are integers.

3. The image processing device as claimed in claim 2, wherein
   the first match judgment unit judges whether or not the first image and the second image are matched in a state where a corner of the first reference area is coincident with a corner of an area including the first reference area.

4. An image processing method comprising:
   accepting a first image and a second image;
   automatically measuring a perimeter of an object image within the first image or an object image within the second image;
   automatically measuring an area of the object image within the first image or the object image within the second image;
   generating a first reference area based on the perimeter measured and the area measured;
   generating a second reference area based on the perimeter measured and the area measured, the second reference area being different from the first reference area;
   extracting datum points from the first image and the second image, respectively;
   making the datum point extracted from the first image and the datum point extracted from the second image coincide with each other so that the first image and the second image are superimposed and so that the first reference area encloses portions of the first image and the second image;
   a first judgment step of judging whether or not the object image within the first image and the object image within the second image are matched, based on a density of the first image within the first reference area and a density of the second image within the first reference area;
   a second judgment step of judging whether or not the object image within the first image and the object image within the second image are matched, based on a density of the first image within the second reference area and a density of the second image within the second reference area; and
   judging whether or not the object image within the first image and the object image within the second image are matched, based on a judgment result obtained by the first judgment step and a judgment result obtained by the second judgment step.

5. The image processing method as claimed in claim 4, wherein the extracting of the datum points extracts each datum point so that coordinate components of each datum point are integers.

6. The image processing method as claimed in claim 4, wherein the first judgment step judges whether or not the first image and the second image are matched in a state where a corner of the first reference area is coincident with a corner of an area including the reference area.

7. A non-transitory computer readable medium storing a program causing a computer to execute a process for performing image processing, the process comprising:
- accepting a first image and a second image;
- automatically measuring a perimeter of an object image within the first image or an object image within the second image;
- automatically measuring an area of the object image within the first image or the object image within the second image;
- generating a first reference area based on the perimeter measured and the area measured;
- generating a second reference area based on the perimeter measured and the area measured, the second reference area being different from the first reference area;
- extracting datum points from the first image and the second image, respectively;
- making the datum point extracted from the first image and the datum point extracted from the second image coincide with each other so that the first image and the second image are superimposed and so that the first reference area encloses portions of the first image and the second image;
- a first judgment step of judging whether or not the object image within the first image and the object image within the second image are matched, based on a density of the first image within the first reference area and a density of the second image within the first reference area;
- a second judgment step of judging whether or not the object image within the first image and the object image within the second image are matched, based on a density of the first image within the second reference area and a density of the second image within the second reference area; and
- judging whether or not the object image within the first image and the object image within the second image are matched, based on a judgment result obtained by the first judgment step and a judgment result obtained by the second judgment step.

8. The computer readable medium as claimed in claim 7, wherein the extracting of the datum points extracts each datum point so that coordinate components of each datum point are integers.

9. The computer readable medium as claimed in claim 7, wherein the first judgment step judges whether or not the first image and the second image are matched in a state where a corner of the first reference area is coincident with a corner of an area including the reference area.

* * * * *